US012612952B2

(12) United States Patent
Stahmer et al.

(10) Patent No.: US 12,612,952 B2
(45) Date of Patent: Apr. 28, 2026

(54) AIR SPRING

(71) Applicant: ContiTech Luftfedersysteme GmbH, Hannover (DE)

(72) Inventors: Reinhard Stahmer, Neustadt am Ruebenberge (DE); Boris Balachonzew, Garbsen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 357 days.

(21) Appl. No.: 18/251,208

(22) PCT Filed: Oct. 12, 2021

(86) PCT No.: PCT/DE2021/200151
§ 371 (c)(1),
(2) Date: Apr. 28, 2023

(87) PCT Pub. No.: WO2022/089694
PCT Pub. Date: May 5, 2022

(65) Prior Publication Data
US 2023/0392663 A1      Dec. 7, 2023

(30) Foreign Application Priority Data

Oct. 29, 2020    (DE) ........................ 10 2020 213 658

(51) Int. Cl.
F16F 9/04                (2006.01)

(52) U.S. Cl.
CPC .... F16F 9/0463 (2013.01); F16F 2224/0208 (2013.01); F16F 2230/0005 (2013.01); F16F 2230/105 (2013.01)

(58) Field of Classification Search
CPC ... F16F 9/0463; F16F 9/0454; F16F 2230/105
See application file for complete search history.

(56) References Cited

U.S. PATENT DOCUMENTS

| | | | |
|---|---|---|---|
| 4,787,606 A | 11/1988 | Geno et al. | |
| 7,325,794 B2 | 2/2008 | Taylor | |

(Continued)

FOREIGN PATENT DOCUMENTS

| | | | | |
|---|---|---|---|---|
| CN | 108884898 A | * | 11/2018 | ............. B60G 11/27 |
| DE | 4230249 A1 | | 3/1994 | |

(Continued)

OTHER PUBLICATIONS

International Search Report dated Jan. 25, 2022 of International Application PCT/DE2021/200151 on which this application is based.

*Primary Examiner* — Thomas W Irvin
(74) *Attorney, Agent, or Firm* — Lippes Mathias LLP

(57)                ABSTRACT

The invention relates to an air spring (1*a*) with an elastic air spring bellows (3*a*), wherein the air spring bellows is tightly connected to an air spring cover (2) at its first open end and to an air spring piston (6*a*) at its second open end and thereby at least partially encloses a working chamber (4) filled with compressed air, wherein the air spring bellows forms a rolling fold (5) which can roll on the air spring piston (6*a*), wherein the air spring bellows has a fastening bead (7*a*) at least at its one end which faces the air spring piston, wherein a radially inwardly extending shoulder region (10*a*) is formed at the bellows-side axial end of the air spring piston (6*a*), wherein a conical sealing seat (9*a*) is formed radially on the inside at the shoulder region, wherein a radially inner sealing face (13*a*) of the fastening bead bears against the conical sealing seat of the air spring piston so as to seal the working chamber, and wherein the underside (14*a*) of the fastening bead pointing towards the air spring piston is pushed axially onto the shoulder region of the air spring piston. It is provided according to the invention that an annular piston shoulder attachment (16*a*) is arranged at the shoulder region of the air spring piston, that the piston (Continued)

Figure 1:
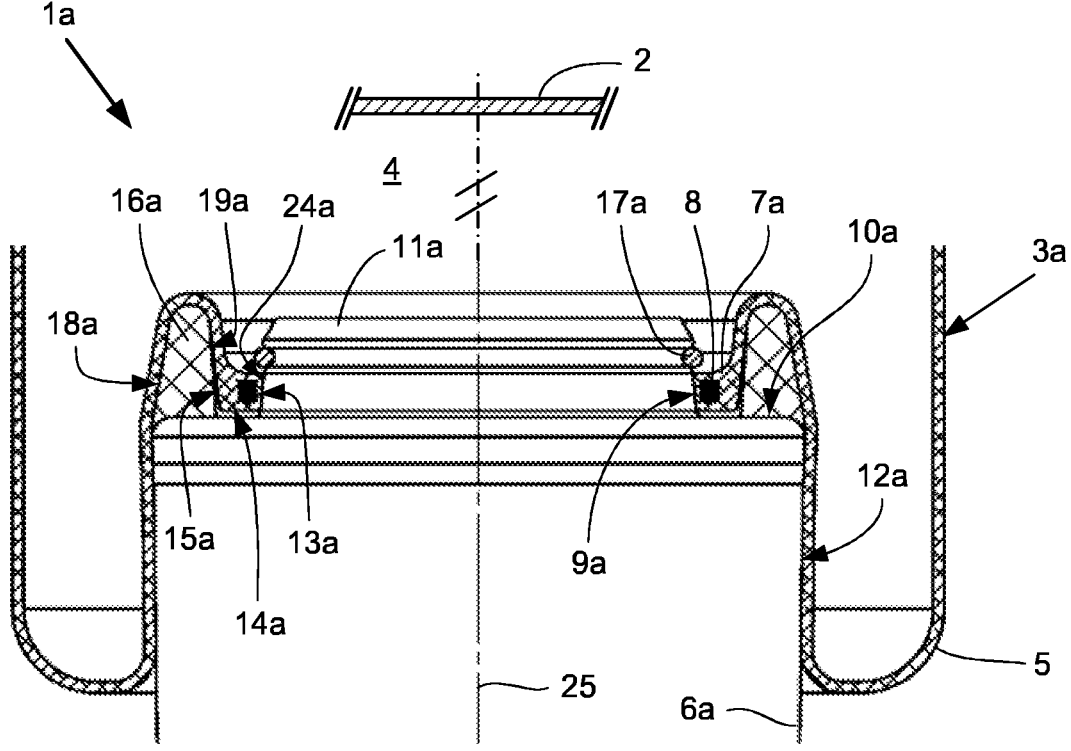

shoulder attachment has a radial inner side (19*a*) which directly or indirectly adjoins the radial outer side (15*a*) of the fastening bead of the air spring bellows, and that the piston shoulder attachment has a radial outer side (18*a*) which, at least in the region of its greatest external diameter, adjoins a radial outer contour (12*a*) of the air spring piston in a radially flush manner.

9 Claims, 5 Drawing Sheets

(56)                     References Cited

U.S. PATENT DOCUMENTS

| | | | |
|---|---|---|---|
| 7,404,547 B2 * | 7/2008 | Taylor ................... | F16F 9/0463 |
| | | | 267/64.27 |
| 2006/0273501 A1 * | 12/2006 | Taylor ..................... | F16F 9/05 |
| | | | 267/64.27 |

| | | | |
|---|---|---|---|
| 2007/0023982 A1 * | 2/2007 | Taylor ................... | F16F 9/0463 |
| | | | 267/113 |
| 2008/0136072 A1 | 6/2008 | Kolb et al. | |
| 2013/0147100 A1 | 6/2013 | Schaefers | |
| 2015/0210134 A1 | 7/2015 | Dehlwes | |
| 2020/0164710 A1 | 5/2020 | Crane et al. | |

FOREIGN PATENT DOCUMENTS

| | | |
|---|---|---|
| DE | 102004015602 A1 | 10/2005 |
| DE | 102008004392 A1 | 7/2009 |
| DE | 102008055511 A1 | 6/2010 |
| DE | 102008055512 A1 | 6/2010 |
| DE | 102010036972 A1 | 2/2012 |
| DE | 102012100753 A1 | 8/2013 |
| EP | 1797346 B1 | 10/2008 |
| EP | 2647871 A1 | 10/2013 |
| EP | 2690306 A1 | 1/2014 |
| WO | 2013182419 A1 | 12/2013 |

* cited by examiner

16e

18c

19c

AIR SPRING

The invention relates to an air spring with an elastic air spring bellows, wherein the air spring bellows is tightly connected to an air spring cover at its first open end and to an air spring piston at its second open end and thereby at least partially encloses a working chamber filled with compressed air, wherein the air spring bellows forms a rolling fold which can roll on the air spring piston, wherein the air spring bellows has a fastening bead at least at its one end which faces the air spring piston, wherein a radially inwardly extending shoulder region is formed at the bellows-side axial end of the air spring piston, wherein a conical sealing seat is formed radially on the inside at the shoulder region, wherein a radially inner sealing face of the fastening bead bears against the conical sealing seat of the air spring piston so as to seal the working chamber, and wherein the underside of the fastening bead pointing towards the air spring piston is pushed axially along the sealing seat in the direction of the shoulder region of the air spring piston.

Air springs are known in a plurality of designs for applications in various sectors. In the vehicle sector, they are clamped between the chassis and bodywork, to achieve a comfortable suspension, for example in road or rail vehicles. In the vehicle sector, they are also used for cab mountings and seat suspension. In other applications, they are used for example as compensators to compensate for relative movements of interconnected pipe systems or for mounting machines or other devices.

Such an air spring has an elastic spring bellows, wherein usually a fastening bead is formed on the two open ends, via which the air spring bellows is attached to two air spring components, the air spring cover and air spring piston. The air spring delimits a working chamber filled with compressed air. Air spring bellows are known in various embodiments, including as rolling bellows with a rolling fold and with a flanged and/or conical fastening bead, as a hose rolling bellows with clamp fixing, or as folded bellows with multiple folds.

During operation, the air spring is subjected to an internal positive pressure, wherein, under the effect of a mechanical load and during spring movements, the air spring bellows rolls on an outer surface of the air spring piston, forming a rolling fold. The usually plate-like air spring cover, viewed in the usage position of the air spring, normally lies on the top of the air spring bellows while the air spring piston is below this. In the case of a chassis spring of a motor vehicle or rail vehicle, the air spring cover is the interface to the vehicle frame, the superstructure or the chassis of the vehicle. The air spring piston constitutes the interface to the vehicle axle.

The lower connection component in the mounted state of the air spring, i.e. the air spring piston, usually consists of a deep-drawn, rolled, spun and welded steel plate. However, it may also consist of a glass-fiber-reinforced or non-reinforced plastic produced in an injection molding process, or an aluminum diecasting.

In order to achieve a tight and secure seat of an end of the air spring bellows on a connecting part of the air spring, various types of seal connection are known. A known connection of an end of the air spring bellows to a connecting component consists of a conical fastening bead which is pushed onto an also conical region of the connecting component.

DE 10 2008 055 511 A1, DE 10 2008 055 512 A1 and EP 1 797 346 B1 disclose for example springs with an air spring piston and an air spring bellows, wherein at its end facing the end spring piston, the air spring bellows has a fastening bead with a bead core. The conical sealing face of the bead lies tightly on a conical sealing seat of the air spring piston. The conical sealing seat also has a separation preventer, formed as a retaining lug, in the upper region for holding the fastening bead.

DE 10 2010 036 972 A1 and WO 2013/182 419 A1 describe air springs with conical sealing seats in which, as separation preventers, locking or clamping rings are provided which are laid in a groove of the air spring piston in order to axially secure a conical fastening bead of the air spring bellows against slipping off the conical sealing seat.

DE 42 30 249 A1 describes an air spring with a partially folded rim of a piston cone end as separation preventer in the mounted state.

DE 10 2012 100 753 A1 describes an air spring with a conical sealing seat in which, in the mounted state of the air bellows, a fastening ring is pushed over the piston cone, the tabs of which are plastically deformed to hold the air spring bellows, so as to create a separation preventer.

EP 2 690 306 A1 discloses an air spring with a cylindrical sealing seat, wherein a pot-like interior of a hollow cylindrical spring piston stands in constant air exchange with a working chamber encased by the air spring bellows. At its open end facing the air spring piston, the air spring bellows has a fastening bead which surrounds the radially inner casing edge of the air spring piston and lies tightly against this inner casing edge. The fastening bead is held in its position on the air spring piston by a fastening ring, such that the air spring bellows surrounds the fastening ring in the manner of a hose. The fastening ring has a wedge-like portion which geometrically corresponds to a portion of the fastening bead which is similarly wedge-like in operation.

The disadvantage is that production and/or installation of an air spring piston with a radially inner connection for the air spring bellows, in particular if a conical sealing seat is provided, is often difficult and complicated.

In spring pistons with a conical sealing seat without separation preventer in the form of a retaining lug or similar, there is usually the risk of the air spring bellows slipping off the sealing seat when the air spring bellows is extended, as occurs on full extension of the air spring. Usually therefore, an additional separation preventer in the form of a retaining lug, a locking ring, a clamp or similar, is essential.

However, the arrangement and design of such a separation preventer next to the sealing seat of the air spring piston causes difficulties in production, for example because of inaccessibility when applying the tool for forming the sheet-metal piston or when removing the cast piston from the casting mold. In particular with an air spring piston made of sheet steel, the forming of a conical sealing face, a retaining lug or flange tabs, is relatively difficult and complex. In air spring pistons made by plastic injection molding or aluminum diecasting, the release and removal of a conical sealing face or retaining lug from the casting mold during the production process is difficult and usually requires several working steps or special devices. In air spring pistons with a ring inserted in a groove as separation preventer for the air spring bellows, the mounting of the ring on an axially recessed support shoulder can be handled without difficulties. In the case of an air spring piston in which the air spring bellows is held on the piston via a clamping ring, because of inaccessibility for the jaws, clamping on a recessed clamping region is not possible.

In this context, the object of the invention is to provide an air spring of the type cited initially, i.e. with elastic air spring bellows and an air spring piston on which the air spring bellows rolls, wherein the air spring piston has an axially recessed support shoulder with a sealing seat for the air spring bellows, which does not have the disadvantages described. In particular, such an air spring can be produced simply and economically and mounted easily. This air spring is suitable for use in air spring systems of motor vehicles, rail vehicles and industrial applications.

This object is achieved by means of an air spring which has the features of the independent claim. Advantageous embodiments and developments of the invention are specified in the dependent claims.

The invention is based on the knowledge that increased loads and comfort requirements for air springs, and rising demand for simple and economic production, require an improved end fastening of the fastening bead of the air spring bellows on the connecting part which is arranged at the bottom in the usage position, and a secure, pressure-resistant and tension-resistant seal of the working chamber. This is achieved by a modified design and installation of a shoulder region of the air spring piston, including the sealing seat and fastening of the fastening bead.

The invention therefore relates to an air spring with an elastic air spring bellows, wherein the air spring bellows is tightly connected to an air spring cover at its first open end and to an air spring piston at its second open end and thereby at least partially encloses a working chamber filled with compressed air, wherein the air spring bellows forms a rolling fold which can roll on the air spring piston, wherein the air spring bellows has a fastening bead at least at its one end which faces the air spring piston, wherein an axially recessed shoulder region is formed at the bellows-side end of the air spring piston and has a sealing seat at its radially inner end, wherein a sealing face of the fastening bead bears against the sealing seat of the air spring piston so as to seal the working chamber, and wherein the underside of the fastening bead pointing towards the air spring piston is pushed along the sealing seat in the direction of the shoulder region of the air spring piston.

To achieve said object with said air spring, the invention provides that a separate annular piston shoulder attachment is arranged at the shoulder region of the air spring piston, that the piston shoulder attachment has a radial inner side which directly or indirectly adjoins the radial outer side of the fastening bead of the air spring bellows, and that the piston shoulder attachment has a radial outer side which, at least in the region of its greatest external diameter, adjoins a radial outer contour of the air spring piston in a radially flush manner so that the attachment closely follows the contour of the piston shoulder.

The following term definitions are used here: A piston shoulder attachment is an attachment for axial extension of the shoulder region of an air spring piston. The shoulder region of an air spring piston is also called the support shoulder.

The proposed technical solution creates an air spring which can easily be produced and installed even with a sealing seat arranged radially deeply on the inside of the air spring piston. The piston shoulder attachment with the features of the invention may be installed on the air spring piston in a separate working step. In particular, the piston shoulder attachment can advantageously be positioned after installation of the air spring bellows. In principle, the air spring may be designed for air spring pistons which have a separation preventer to protect the air spring bellows from unintended release of its end fastening on the air spring piston, and for air spring pistons without such a separation preventer. The shoulder region of the air spring piston may be structurally designed so simply that forming tools can be applied more easily or the casting molds handled more easily during production of the piston. This is achieved in that the axial end shoulder region of the air spring piston is only completed by the attachment in a separate mounting step. The air spring bellows is supported on the shoulder region of the air spring piston by the piston shoulder attachment, and in operation of the air spring safely rolls on the piston casing via the piston shoulder attachment. The rolling bellows may also protect the attachment from radially slipping on the shoulder region of the air spring piston, or center this to the piston. It is also possible to remove the mounted piston shoulder attachment again from the shoulder region of an air spring piston. Thus a simple and non-destructive removal of the air spring is possible.

In production of an air spring piston of sheet steel for an air spring having the features of the invention, if required, a conical sealing seat and a radially circumferential retaining lug can easily be formed in the material since the piston shoulder attachment can be mounted in a later working step. The support shoulder or piston shoulder region may be formed in one plane, i.e. without protrusions or depressions. The piston shoulder attachment and the support shoulder thus do not obstruct a rolling tool or similar during forming of the sealing seat and retaining lug on the piston body.

Also, conical sealing seats and retaining lugs can be formed during production of air spring pistons of plastic or aluminum diecasting, since the piston shoulder attachment to be inserted later need not be taken into account in the design of the casting mold. Thus simple casting molds may be used which require no special devices for removing the air spring piston from the mold after the casting process.

Also, air spring pistons may be produced with clamping devices for fastening the fastening bead, wherein the clamping device, e.g. a clamping ring, has a smaller diameter than the outer diameter of the air spring piston or piston casing on which the air spring bellows rolls. Mounting of the clamping ring is simplified since the piston shoulder attachment can be placed in its definitive position after insertion of the clamping ring in a piston groove or similar. The radial distance between the clamping ring outer diameter and the radial outer piston diameter can be effectively bridged by the piston shoulder attachment. The piston diameter and clamping ring outer diameter can therefore be designed largely independently of one another. In any case, the supporting force of the air spring is not reduced by a clamping device of smaller diameter for the air spring bellows. Also, by an air spring bellows clamped onto a radially inner sealing seat, in comparison with an air spring bellows clamped on the outer periphery of the air spring piston, by means of the piston shoulder attachment, a greater spring travel can be achieved in the direction of extension of the air spring.

Also, in a piston with conical seal and horizontal shoulder, a greater spring travel can be achieved by the shoulder attachment. The attachment constitutes a piston casing extension without enlarging the installation length or reducing the clearance. According to an advantageous embodiment of the invention, it may be provided that the piston shoulder attachment consists of at least two individual ring segments, wherein in the mounted state, the ring segments lie loosely against one another at their ends and thus form a geometrically continuous closed ring. Accordingly, the piston shoulder attachment may be made of multiple pieces. A multipiece piston shoulder attachment may for example consist of two ring segments. This is advantageous if the fastening bead of the air spring bellows is particularly stiff or its diameter is so large that a one-piece piston shoulder attachment could not, or only with difficulty, be drawn over the fastening bead during installation. A piston shoulder attachment divided into two over its circumference can however easily be laid around the fastening bead.

A refinement provides that the piston shoulder attachment consists of at least two individual ring segments which, in the mounted state, form a continuous closed ring, wherein the ring segments can be connected together by form fit via connecting means arranged on the ring segments, such as for example snap or latch elements. Accordingly, the piston shoulder attachment may for example consist of two equal-sized and identical ring segments which each have a latching hook at one end and a latching groove at the other end, which are brought into engagement with one another on installation. Thus in the mounted state, a fixedly closed ring is formed in which disruptive relative movements of the ring segment on extension and compression of the air spring are excluded.

According to a further refinement of the air spring, it is provided that the piston shoulder attachment is formed as a hollow body having a radial outer side and a radial inner side which are fixedly and integrally connected together by a rib structure arranged in between. Thus a weight-optimized, i.e. particularly light, but nonetheless very stable piston shoulder attachment is formed, which is well protected from deformation due to loads in spring operation.

According to a further embodiment of the invention, it may be provided that the piston shoulder attachment is designed to be placeable loosely on the shoulder region of the air spring piston. Accordingly, it is sufficient to place the piston shoulder attachment on the shoulder region of the air spring piston since, in operation of the definitively mounted spring, the piston shoulder attachment automatically lies on the air spring piston. This makes installation of the air spring particularly simple.

An alternative embodiment provides that piston shoulder attachment can be connected to the shoulder region of the air spring piston by force and/or form fit via connecting means. Accordingly, the piston shoulder attachment may be fixedly connected to the shoulder region of the air spring piston, for example by screwing, clamping and/or bonding. The piston shoulder attachment is thus secured against lifting away from the shoulder region of the air spring piston during spring operation.

The air spring with the features of the invention may be constructed with air spring pistons which consist of different materials. Accordingly, depending on requirements for strength, temperature resistance and/or chemical resistance, the air spring piston may be produced as a deep-drawn sheet steel formed part, a plastic injection molding or a diecasting of a casting alloy, such as an aluminum diecasting or zinc diecasting.

Finally, the invention also concerns an air spring piston of an air spring which is constructed according to at least one of the above-described features or those defined in the device claims.

Figure 2:
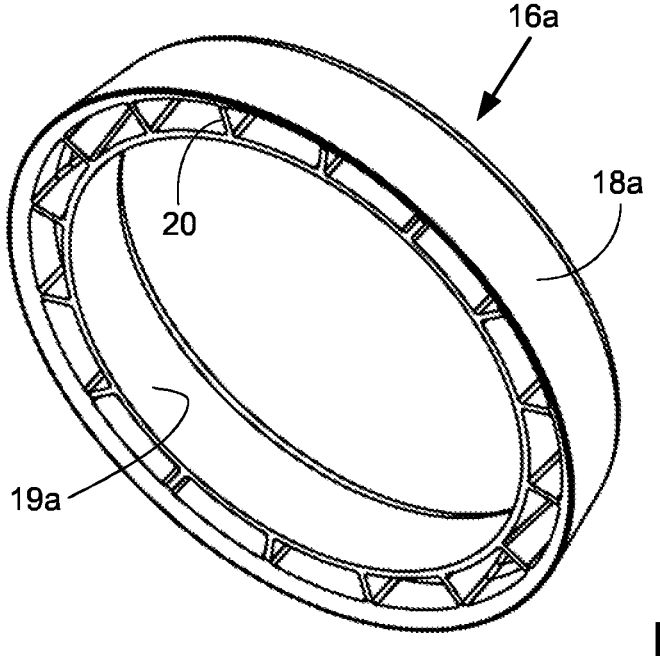
Figure 3:
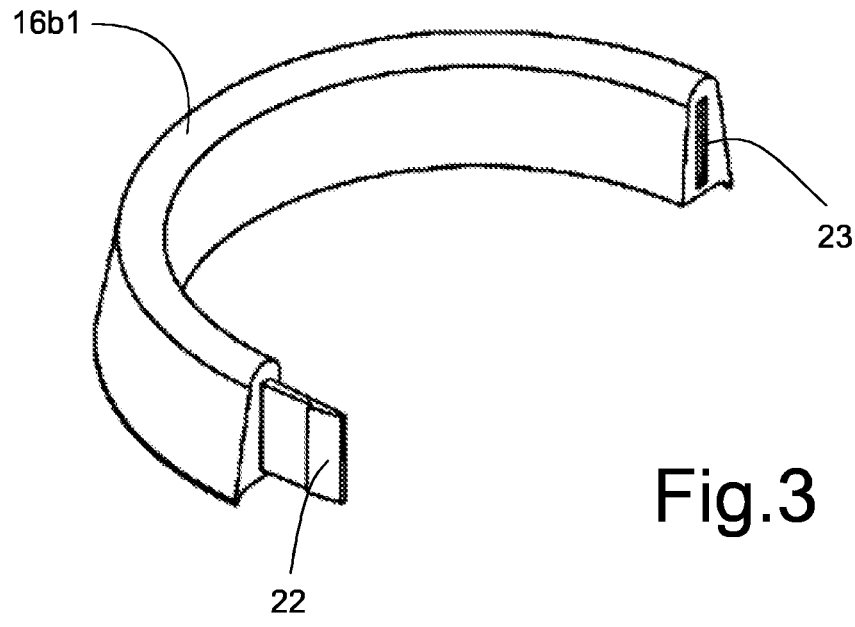
Figure 4:
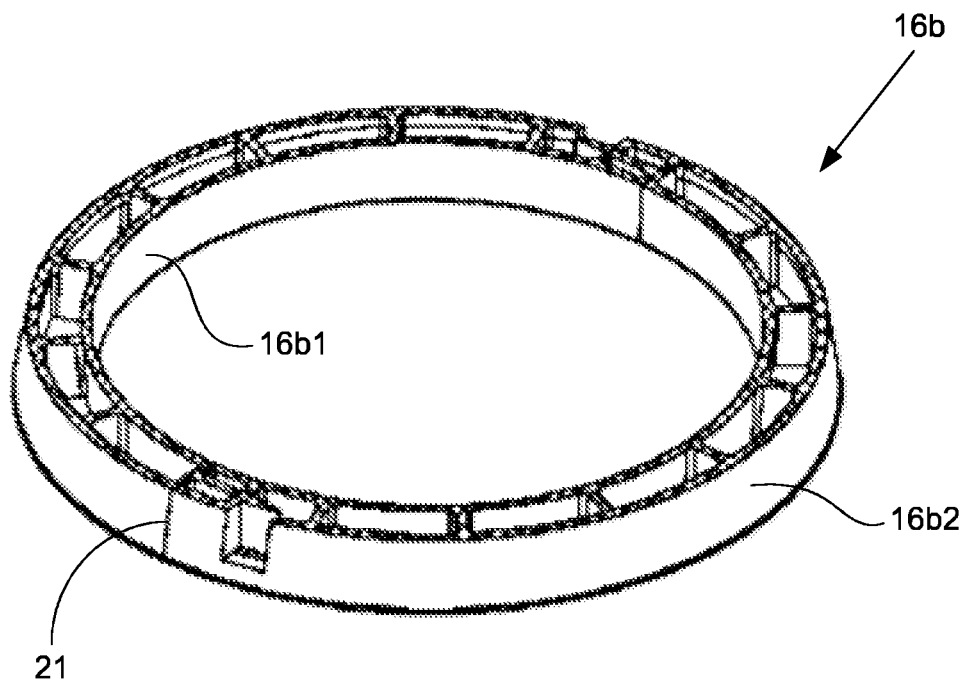
Figure 5:
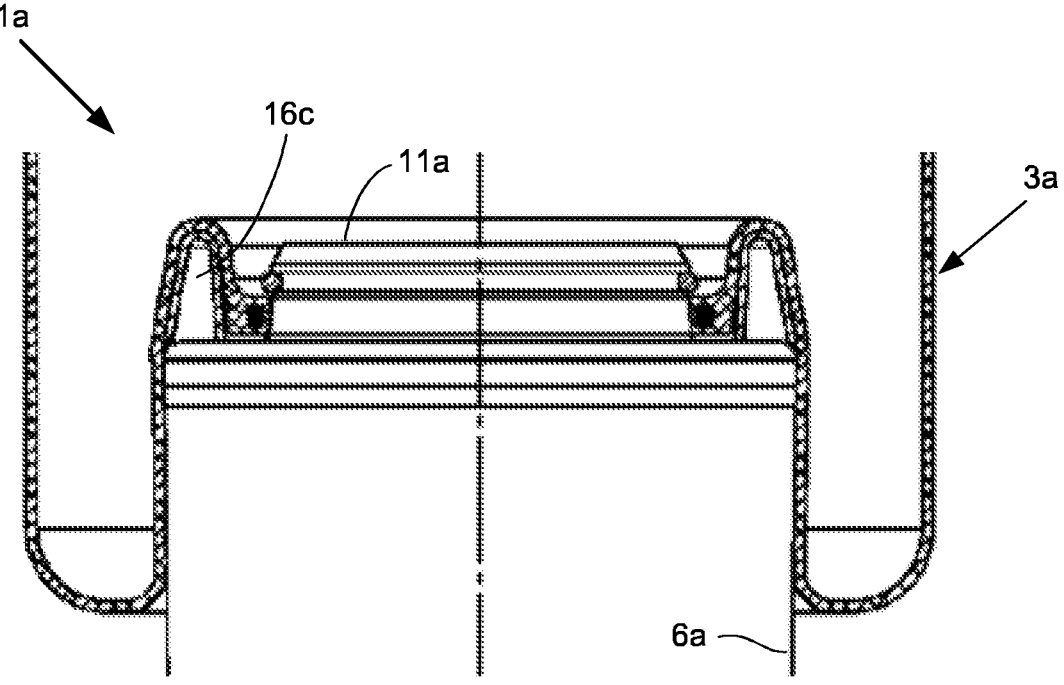
Figure 6:
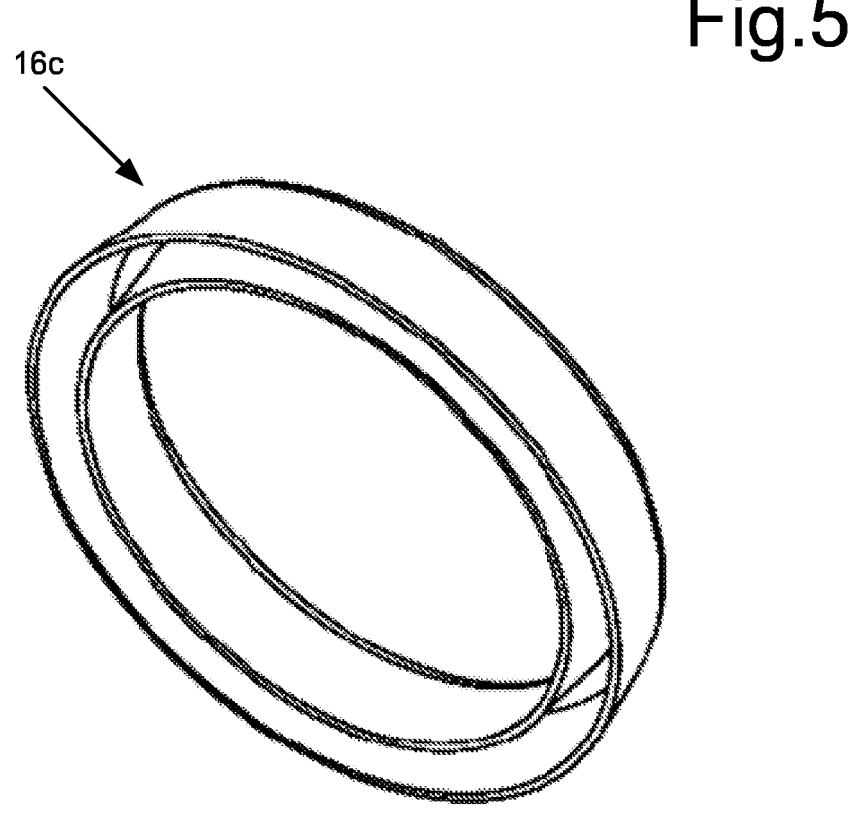
Figure 7:
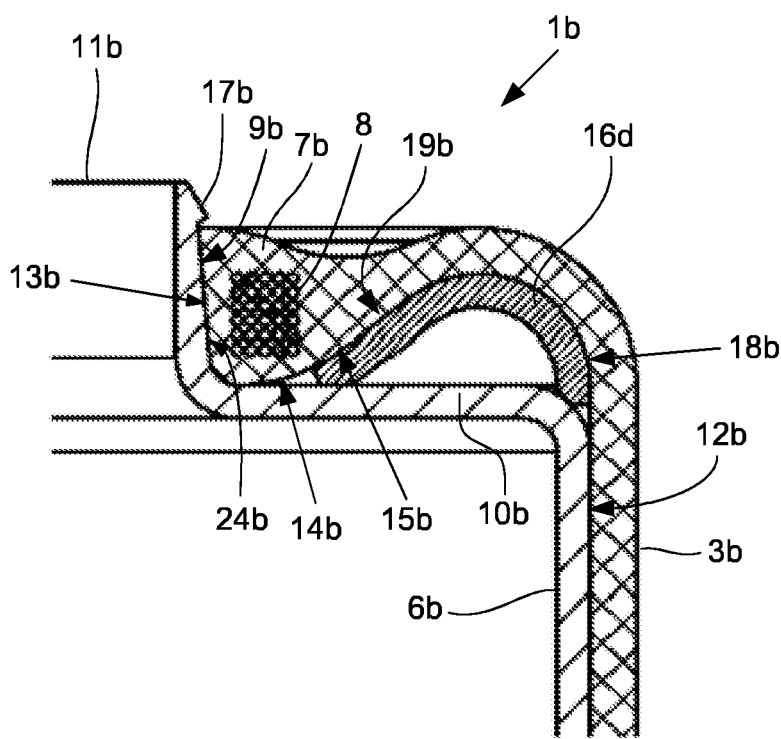
Figure 8:
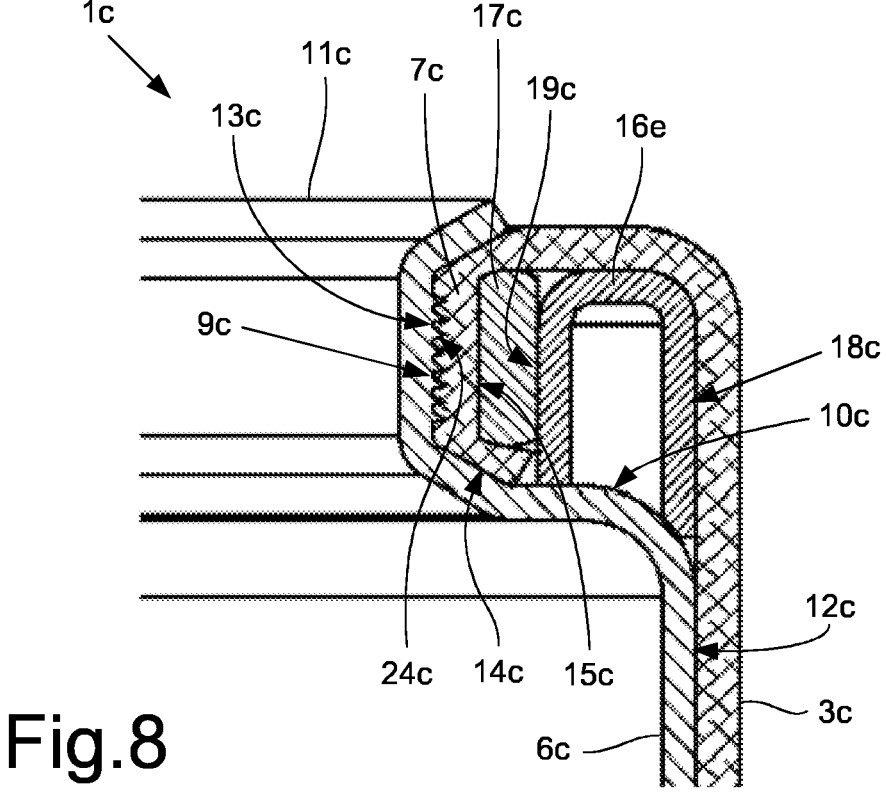
Figure 9:
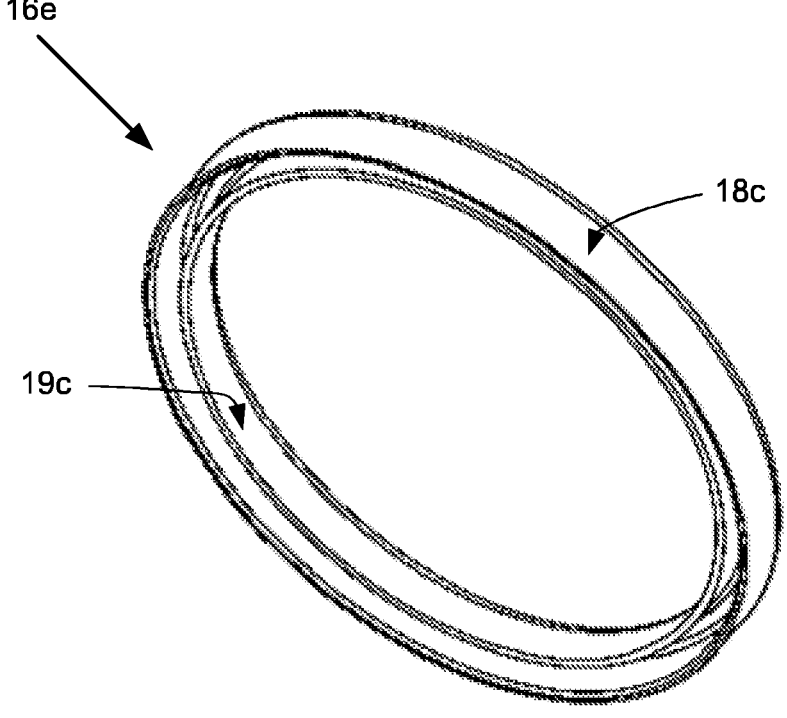

The invention will be discussed in more detail below on the basis of exemplary embodiments illustrated in the appended drawings. In the drawings:

FIG. 1 shows a portion of an air spring with an air spring bellows, an air spring piston and a piston shoulder attachment, in an axial longitudinal section in a plane running along a longitudinal axis of the piston shoulder attachment, according to a first embodiment of the invention, FIG. 2 shows a perspective view of the piston shoulder attachment according to FIG. 1, FIG. 3 shows a perspective view of a part of a two-piece piston shoulder attachment according to a second embodiment of an air spring according to the invention, FIG. 4 shows the piston shoulder attachment from FIG. 3 in cross-section in a plane running perpendicular to the longitudinal axis of the piston shoulder attachment, FIG. 5 shows a portion of a piston shoulder attachment in axial longitudinal section similar to that in FIG. 1, but according to a third embodiment of the invention, FIG. 6 shows a perspective view of the underside, near the piston, of the piston shoulder attachment from FIG. 5, FIG. 7 shows a portion of an air spring with a piston shoulder attachment in axial longitudinal section according to a fourth embodiment of the invention, FIG. 8 shows a portion of an air spring with a piston shoulder attachment in axial longitudinal section according to a fifth embodiment of the invention, and FIG. 9 shows a perspective view of the underside, near the piston, of the piston shoulder attachment from FIG. 8.

Some components in the figures correspond in structure and/or function, so these are designated with the same reference signs for the sake of simplicity.

The structure and function of an air spring are known in themselves. For example, reference is made to the previously mentioned patent applications DE 10 2008 055 511 A1, DE 42 30 249 A1 and WO 2013/182 419 A1. For simplicity, the figures are each restricted to a portion of an axial longitudinal section along a longitudinal axis 25 or axis of symmetry through a cylindrical air spring. In these air springs, a respective air spring bellows is tightly connected to an air spring piston and an air spring cover, and via these can be connected to a component of a chassis and a component of a vehicle body of a motor vehicle.

Accordingly, the first air spring 1a shown in extract in FIG. 1 has an air spring cover 2 (merely indicated) and a first air spring piston 6a, on which a first air spring bellows 3a is tightly attached via a respective open end. The air spring bellows 3a is made of an elastomer, at least partially delimits a working chamber 4 filled with compressed air, and in operation rolls on the first air spring piston 6a, forming at least one rolling fold 5.

The connection of the air spring piston 6a on the air spring cover side is not the subject of the invention; therefore the following description is restricted to the connection of the air spring bellows 3a on the air spring piston side. The first air spring bellows 3a accordingly has, on its open end on the piston side, a first fastening bead 7a formed as a ring and conical in the axial section of the air spring body. A bead core 8, for example a wire ring, is inserted and vulcanized in the fastening bead 7a. The first air spring bellows 3a may be reinforced with a fabric laid in the elastomer as a strength carrier, wherein the strength carrier is preferably connected to the bead core 8.

The fastening bead 7a is arranged on a first sealing seat 9a which is conical in the axial section of the air spring piston 6a. This sealing seat 9a is formed on a first cylindrical piston extension 11a of the air spring piston 6a on the working chamber side, and has a smaller outer diameter than the outer contour 12a of the casing of the air spring piston 6a. Thus a first shoulder region 10a, which extends radially, is formed between the piston extension 11a and the radial outer contour 12a of the casing of the air spring piston 6a.

The fastening bead 7a of the air spring bellows 3a closely and tightly follows, with its radially inner first sealing face 13a, an assigned first sealing face 24a of the first sealing seat 9a or piston extension 11a. The underside 14a of the fastening bead 7a sits at a distance from the shoulder region 10a of the air spring piston 6a. The radial outer side 15a of the fastening bead 7a lies with play on a first piston shoulder attachment 16a described in more detail below.

Also, a first separation preventer 17a is arranged on this first air spring 1a so as to secure the fastening bead 7a against detachment. The separation preventer 17a is in this case formed as a locking ring which is laid in a groove arranged in the piston extension 11a of the air spring piston 6a above the fastening bead 7a, and secures the fastening bead 7a against removal from its sealing seat 9a under tensile forces which are generated in the axial direction during operation of the first air spring 1a and act on the air spring bellows 3a and on the fastening bead 7a.

The first piston shoulder attachment 16a shown in perspective in FIG. 2 is produced as a one-piece plastic injection molding according to a first exemplary embodiment of the invention. This piston shoulder attachment 16a is here substantially conical in the axial section of the air spring 1a, and is rounded at its upper region facing away from the shoulder region 10a of the air spring piston 6a (see also FIG. 1). In this case, the piston shoulder attachment 16a is formed as an annular hollow body, with a rib structure 20 between the radial outer side 18a (outer casing) and radial inner side 19a (inner casing), fixedly connecting these together in form-stable fashion. Alternatively, such a piston shoulder attachment may be produced for example as a solid body of plastic or an aluminum diecasting.

The first piston shoulder attachment 16a in FIGS. 1 and 2 is in this case placed loosely on the shoulder region 10a of the air spring piston 6. For this, on mounting of the air spring 1a according to FIG. 1, the piston shoulder attachment 16a is first pushed over the first fastening bead 7a on the piston side. Then the first fastening bead 7a is pushed or pressed onto the sealing seat 9a. Then the separation preventer 17a, formed as a locking ring, is inserted in the assigned groove of the piston extension 11a of the piston 6a. Then the piston shoulder attachment 16a is pulled down over the first fastening bead 7a in the direction of the shoulder region 10a of the air spring piston 6a. Finally, the air spring bellows 3a, as shown in FIG. 1, is rolled up or down over the piston shoulder attachment 16a and air spring piston 6a. The first air spring bellows 1a closely follows the radial outer side 18a of the piston shoulder attachment 16a and also the radial outer contour 12a of the air spring piston 6a. The active supporting surface of the air spring 1a is accordingly defined not by the outer diameter of the first fastening bead 7a but by the larger outer diameter of the piston shoulder attachment 16a or the outer diameter of the air spring piston 6a, as well as by the outer diameter of the air spring in operation. Also, the piston length usable for rolling of the air spring bellows 3a is extended.

FIGS. 3 and 4 show, in another variant, a second piston shoulder attachment 16b which, like the first piston shoulder attachment 16a in FIG. 2, is formed as a ribbed hollow body of plastic. However, the second piston shoulder attachment 16b is split twice over its circumference, giving two equal-sized ring segments 16b1, 16b2. The two ring segments 16b1, 16b2 each have, at both circumferential ends, a latching lug 22 and latching groove 23 which engage in one another in the mounted state of the second piston shoulder attachment 16b and create a latching connection 21 by force and form fit. The two-piece second piston shoulder attachment 16b may if required only be assembled during installation of the air spring, thereby facilitating installation on the air spring piston 6a.

FIGS. 5 and 6 show another refinement of the air spring 1a according to FIG. 1 with a third piston shoulder attachment 16c. This third piston shoulder attachment 16c is shown in perspective in FIG. 6 and produced as a one-piece sheet metal formed part, for example a deep-drawn sheet steel part. The profile of the third piston shoulder attachment 16c is geometrically based on or identical to the conical profile, rounded at the top, of the first piston shoulder attachment 16a from FIG. 1. FIG. 5 shows, for comparison, the third piston shoulder attachment 16c in the mounted state on the otherwise identical air spring 1a from FIG. 1.

FIG. 7 shows in extract a fourth embodiment of a second air spring 1b having the features of the invention, wherein this second air spring 1b has a second air spring piston 6b and a second air spring bellows 3b. The second air spring bellows 3b has, on its end on the air spring piston side, a second fastening bead 7b formed as a ring and conical in the axial section of the air spring body. An annular bead core 8 is also vulcanized into the second fastening bead 7b.

The second fastening bead 7b is arranged on a second sealing seat 9b which is conical in the axial section of the second air spring piston 6b. This second sealing seat 9b is formed on a second piston extension 11b of the second air spring piston 6b on the working chamber side, with a smaller outer diameter than said second air spring piston 6b. A second shoulder region 10b is formed on the second air spring piston 6b radially between the second piston extension 11b and the outer contour 12b of the casing of said second air spring piston 6b.

The fastening bead 7b of the air spring bellows 3b closely and tightly follows, with its radially inner second sealing face 13b, an assigned second sealing face 24b of the second sealing seat 9b. The underside 14b of the second fastening bead 7b sits close to the shoulder region 10b of the second air spring piston 6b. The radial outer side 15b of this second fastening bead 7b lies on a fourth piston shoulder attachment 16d. Also, a second separation preventer 17b is formed on the second air spring 1b and holds the second fastening bead 7b axially. This second separation preventer 17b is formed as a circumferential retaining lug which axially and radially extends over the fastening bead 7b above its radially inner sealing face 13b.

The fourth piston shoulder attachment 16b in the present case is formed as an integral, deep-drawn, half-shell sheet steel formed part. The fourth piston shoulder attachment 16d, by its geometry and particular its radial outer side 18b, axially extends the outer contour 12b of the radially outer casing of the second air spring piston 6b. In the axial section of the second air spring 1b according to FIG. 7, it is clear that the second piston shoulder attachment 16d is formed substantially circular and is angled at its radially inner side 19b towards the radially outer side of the fastening bead 7b and adapted to the contour of the fastening bead 7b. The form of the shoulder attachment 16d is also adapted to the piston shoulder region 10b and the radius from the transition of the shoulder to the piston outer contour 12b. In addition, the attachment is centered to the piston in the present exemplary embodiment. The axial height of the fourth piston shoulder attachment 16d is however smaller than that of the first piston shoulder attachment 16a in FIG. 1.

During installation, first the fourth piston shoulder attachment 16d is placed on the shoulder region 10b of the second air spring piston 6b, and then the air spring bellows 3b is pulled onto the second sealing seat 9b. The separation preventer 17b and the piston shoulder attachment 16d in the mounted state guarantee a secure holding of the bellows bead 7b on the assigned sealing seat 9b.

Finally, FIGS. 8 and 9 show a fifth embodiment of a third air spring 1c which has a third air spring piston 6c and a third air spring bellows 3*c*. FIG. 8 again shows only a diagrammatic extract of the third air spring 1*c*. This third air spring bellows 3*c* accordingly has, on its open end on the air spring piston side, a third bellows end piece 7*c* formed as a ring and cylindrical in the axial section of the air spring body. The third bellows end piece 7*c* is in engagement with a radial depression in a third cylindrical piston extension 11*c* of the third air spring piston 6*c*, wherein this depression forms a third sealing seat 9*c*. The third sealing surface 24*c* of the third sealing seat 9*c*, and the geometrically corresponding third sealing face 13*c* of the third bellows end piece 7*c*, are in the present case formed with multiple grooves over the circumference, such that opposite grooves and protrusions are in alternate mutual engagement. The radial outer side 15*c* of the third bellows end piece 7*c* is enclosed by a third separation preventer 17*c* formed as a clamping ring, and thereby clamped against the third sealing seat 9*c*.

The third sealing seat 9*c* is formed radially on the inside relative to the third outer contour 12*c* of the third air spring piston 6*c*, so that a radially extending third shoulder region 10*c* is formed on the third air spring piston 6*c*. The third separation preventer 17*c* is held radially outwardly by a fifth piston shoulder attachment 16*e* which is placed at least partially on the third shoulder region 10*c* of the third air spring piston 6*c*. This fifth piston shoulder attachment 16*e* has a U-shaped profile geometry in cross-section. In the mounted state, the radial outer side 18*c* of its radially outer U leg runs clearly flush with the radial outer contour 12*c* of the third air spring piston 6*c*. The radial inner side 19*c* of the radially inner U leg of the fifth piston shoulder attachment 16*e* lies with form fit on the third separation preventer 17*c* formed as a clamping ring.

FIG. 9 shows the fifth piston shoulder attachment 16*e* in a perspective view onto its recess. This fifth piston shoulder attachment 16*e* is formed in the present example from sheet steel as an integral deep-drawn formed part.

The third air spring 1*c* is installed in a similar manner to the first air spring 1*a* already described, wherein the fifth piston shoulder attachment 16*e* is only placed on the shoulder region 10*c* during a final installation step. Accordingly, firstly the fifth piston shoulder attachment 16*e* is pushed over the air spring bellows 3*c*, followed by the separation preventer 17*c* formed as a clamping ring. Then the still cylindrical third bellows end piece 7*c* is pushed onto the sealing seat 9*c*. Then the separation preventer 17*c*, formed as a clamping ring, is pushed over the bellows end piece and clamped, and finally the fifth piston shoulder attachment 16*e* is pulled down over the separation preventer 17*c* up to the shoulder region 10*c* of the piston 6*c*. During rolling, in operation of the air spring 1*c*, the air spring bellows 1*c* closely follows the radial outer side 18*c* of the fifth piston shoulder attachment 16*e*.

Because of the arrangement of the fifth piston shoulder attachment 16*e*, a separation preventer 17*c* of small diameter is advantageously combined with a large rolling diameter of the air spring bellows 3*c* on the air spring piston 6*c*, namely the outer diameter of the fifth piston shoulder attachment 16*e*. In comparison with known clamped air springs in which the diameter of the separation preventer is also the rolling diameter of the air spring bellows on the air spring piston, in the present case a higher supporting force of the air spring 1*c* can be achieved.

LIST OF REFERENCE SIGNS

1*a* First air spring (1st to 3rd embodiment)
1*b* Second air spring (4th embodiment)

1*c* Third air spring (5th embodiment)
2 Air spring cover
3*a* First air spring bellows (1st to 3rd embodiment)
3*b* Second air spring bellows (4th embodiment)
3*c* Third air spring bellows (5th embodiment)
4 Working chamber
5 Rolling fold
6*a* First air spring piston (1st to 3rd embodiment)
6*b* Second air spring piston (4th embodiment)
6*c* Third air spring piston (5th embodiment)
7*a* First fastening bead (1st to 3rd embodiment)
7*b* Second fastening bead (4th embodiment)
7*c* Third bellows end piece (5th embodiment)
8 Bead core
9*a* First sealing seat (1st to 3rd embodiment)
9*b* Second sealing seat (4th embodiment)
9*c* Third sealing seat (5th embodiment)
10*a* First shoulder region of air spring piston (1st to 3rd embodiment)
10*b* Second shoulder region of air spring piston (4th embodiment)
10*c* Third shoulder region of air spring piston (5th embodiment)
11*a* First piston extension (1st to 3rd embodiment)
11*b* Second piston extension (4th embodiment)
11*c* Third piston extension (5th embodiment)
12*a* First outer contour of air spring piston (1st to 3rd embodiment)
12*b* Second outer contour of air spring piston (4th embodiment)
12*c* Third outer contour of air spring piston (5th embodiment)
13*a* First sealing face of fastening bead (1st to 3rd embodiment)
13*b* Second sealing face of fastening bead (4th embodiment)
13*c* Third sealing face of fastening bead (5th embodiment)
14*a* First underside of fastening bead (1st to 3rd embodiment)
14*b* Second underside of fastening bead (4th embodiment)
14*c* Third underside of fastening bead (5th embodiment)
15*a* First outer side of fastening bead (1st to 3rd embodiment)
15*b* Second outer side of fastening bead (4th embodiment)
15*c* Third outer side of fastening bead (5th embodiment)
16*a* First piston shoulder attachment (1st embodiment)
16*b* Second piston shoulder attachment (2nd embodiment)
16*b1* First ring segment of multipiece piston shoulder attachment 16*b*
16*b2* Second ring segment of multipiece piston shoulder attachment 16*b*
16*c* Third piston shoulder attachment (3rd embodiment)
16*d* Fourth piston shoulder attachment (4th embodiment)
16*e* Fifth piston shoulder attachment (5th embodiment)
17*a* First separation preventer (1st to 3rd embodiment)
17*b* Second separation preventer (4th embodiment)
17*c* Third separation preventer (5th embodiment)
18*a* First outer side of piston shoulder attachment (1st to 3rd embodiment)
18*b* Second outer side of piston shoulder attachment (4th embodiment)
18*c* Third outer side of piston shoulder attachment (5th embodiment)

19a First inner side of piston shoulder attachment (1st to 3rd embodiment)

19b Second inner side of piston shoulder attachment (4th embodiment)

19c Third inner side of piston shoulder attachment (5th embodiment)

20 Rib structure of piston shoulder attachment (1st and 2nd embodiment)

21 Latch connection of piston shoulder attachment (2nd embodiment)

22 Latching lug of piston shoulder attachment (2nd embodiment)

23 Latching groove of piston shoulder attachment (2nd embodiment)

24a First sealing face of sealing seat (1st to 3rd embodiment)

24b Second sealing face of sealing seat (4th embodiment)

24c Third sealing face of sealing seat (5th embodiment)

25 Longitudinal axis of air spring, axis of symmetry

The invention claimed is:

1. An air spring comprising:

an elastic air spring bellows;

an air spring cover;

an air spring piston;

the air spring bellows is tightly connected to an air spring cover at a first open end and to an air spring piston at a second open end and defines a working chamber;

the air spring bellows forms a rolling fold on the air spring piston;

the air spring bellows has a fastening bead on the second open end;

the air spring piston comprises a radially inwardly extending shoulder region;

a sealing agent is formed on an inside of the shoulder region;

a radially inner sealing face of the fastening bead bears against a sealing seat of the air spring piston;

an underside of the fastening bead pushed axially along the sealing seat in a direction of a shoulder region;

a separate, annular piston shoulder attachment is formed at the shoulder region of the air spring piston;

the piston shoulder attachment has a radial inner side which adjoins the radial outer side of the fastening bead or the bellows end piece of the air spring bellows;

the piston shoulder attachment has a radial outer side having in a region of its greatest external diameter, adjoins a radial outer contour of the air spring piston in a radially flush manner; and the piston shoulder attachment is designed to be placeable loosely on the shoulder region of the air spring piston.

2. The air spring of claim 1, wherein the piston shoulder attachment consists of two individual ring segments and that lie against one another at their ends and form a continuous closed ring in the mounted state.

3. The air spring of claim 1, wherein the piston shoulder attachment consists of two individual ring segments that are connected together by form fit and form a continuous closed ring in a mounted state.

4. The air spring of claim 1, wherein the piston shoulder attachment is formed as a hollow body having a radial outer side and a radial inner side which are fixedly connected together by a rib structure arranged in between.

5. The air spring of claim 1, wherein the piston shoulder attachment is connected to the shoulder region of the air spring piston by force.

6. The air spring of claim 1, wherein the piston shoulder attachment is produced as a deep-drawn sheet steel formed part.

7. The air spring of claim 1, wherein the piston shoulder attachment is produced as a plastic injection molding.

8. The air spring of claim 1, wherein the piston shoulder attachment is produced as a diecasting of a casting alloy.

9. An annular piston shoulder attachment for an air spring comprising:

a hollow body;

a radial inner side of the hollow body that adjoins a radial outer side of a bellows end piece of an air spring bellows;

a radial outer side of the hollow body that adjoins a radial outer contour of an air spring piston in a radially flush manner;

the radial outer side of the hollow body and the radial inner side of the hollow body connected together by a rib structure;

the annular piston shoulder attachment is at a shoulder region of the air spring piston; and a first ring segment and a second ring segment connected together to form a continuous closed ring in a mounted state.

* * * * *